(12) United States Patent
Petersen et al.

(10) Patent No.: US 8,732,142 B2
(45) Date of Patent: May 20, 2014

(54) GENERATION OF SUGGESTIONS TO CORRECT DATA RACE ERRORS

(75) Inventors: Paul M Petersen, Champaign, IL (US); Zhiqiang Ma, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 12/059,108

(22) Filed: Mar. 31, 2008

(65) Prior Publication Data

US 2009/0248689 A1 Oct. 1, 2009

(51) Int. Cl.
*G06F 7/00* (2006.01)
*G06F 17/00* (2006.01)

(52) U.S. Cl.
USPC .......................................................... 707/704

(58) Field of Classification Search
None
See application file for complete search history.

(56) References Cited

U.S. PATENT DOCUMENTS

| 7,120,903 | B2 * | 10/2006 | Toi et al. | 717/149 |
| 2005/0038806 | A1 * | 2/2005 | Ma | 707/102 |
| 2005/0283780 | A1 * | 12/2005 | Karp et al. | 718/100 |
| 2007/0094669 | A1 * | 4/2007 | Rector et al. | 718/104 |

OTHER PUBLICATIONS

O'Callahan et al. "Hybrid Dynamic Data Race Detection" IBM T.J. Watson Research Center ACM Jun. 11-13, 2003, San Diego, CA USA.*

Yu et al. "Race Track: Efficient Detection of Data Race Conditions via Adaptive Tracking" SOSP'05, Oct. 23-26, 2005, Brighton, United Kingdom. Copyright 2005 ACM 1-59593-079-5/05/0010.*

* cited by examiner

*Primary Examiner* — Pierre M. Vital
*Assistant Examiner* — Berhanu Mitiku
(74) *Attorney, Agent, or Firm* — Garrett IP, LLC

(57) ABSTRACT

A method of removing a first data race condition by generating a list of suggested solutions is provided. The method comprises detecting the first data race condition involving a shared resource that is accessed first by a first thread and then by a second thread; suggesting one or more solutions using a lockset mechanism; suggesting one or more solutions using a vector clock mechanism; suggesting that a user create a new synchronization object; suggesting that a user replicate the shared resource; and displaying the list to the user.

16 Claims, 4 Drawing Sheets

GENERATION OF SUGGESTIONS TO CORRECT DATA RACE ERRORS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to thread synchronization, and more particularly to a system and method for providing or suggesting possible solutions for removing data race conditions.

BACKGROUND

In modern operating systems, one or more threads (components of a process which execute tasks) may share common system resources. A data race condition occurs when two or more threads concurrently access a shared resource without synchronization. A data race condition may lead to data race errors where data stored on the shared resource may be different depending on the order in which the threads access the shared resource.

Synchronization is typically implemented using locks, mutexes, semaphores, or other synchronization objects. When one or more threads acquire a synchronization object before accessing a shared resource, the object synchronizes the threads' access to the shared resource, preventing data race conditions from occurring.

A data race condition may thus be removed by synchronizing thread access to a shared resource or by replicating the shared resource. Currently available tools that detect data race conditions, however, are incapable of providing or suggesting possible solutions for removing data race conditions. Systems and methods are needed to overcome the above-noted shortcomings.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to systems and methods for generation of suggestions for correcting data race errors.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A method of removing a first data race condition by generating a list of suggested solutions is provided. The method comprises detecting the first data race condition involving a shared resource that is accessed by a first thread and a second thread, wherein the first thread accesses the shared resource before the second thread; suggesting that the first thread acquire at least a first lock synchronization object that the second thread holds, in response to determining that lockset information is available; suggesting that the second thread acquire at least a second lock synchronization object that the first thread holds, in response to determining that lockset information for first access to the shared resource is available; suggesting that the second thread acquire at least a third synchronization object according to a vector clock mechanism, in response to determining that vector clock information is available and the first thread is ordered by at least the third synchronization object; suggesting that a user create at least a fourth synchronization object; suggesting that a user replicate the shared resource; and displaying the list to the user.

In accordance with another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

Figure 1:
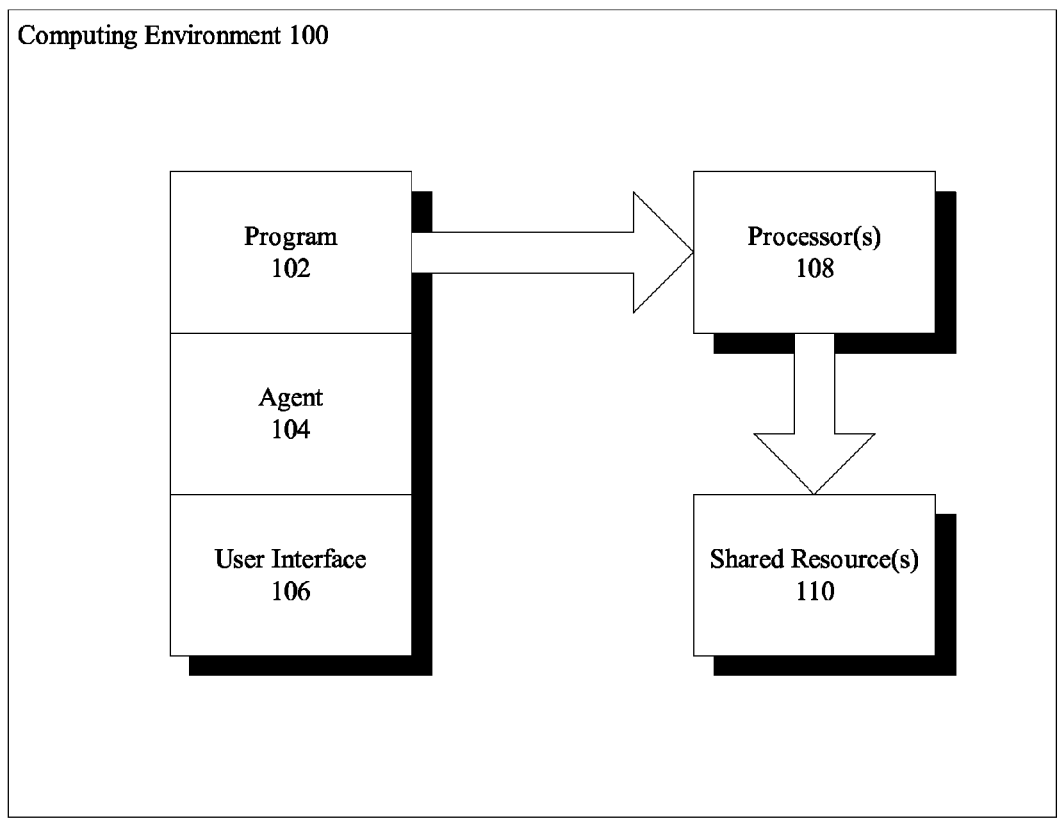
FIG. 1 is a block diagram of an exemplary computing environment for generating suggestions for a removing data race condition, in accordance with one embodiment.

Referring to FIG. 1, in accordance with one embodiment, an exemplary computing environment 100 comprises program 102, agent 104, user interface 106, processor(s) 108, and shared resource(s) 110. Program 102 may be a multi-threaded program that, when executed by processor(s) 108, accesses memory locations in shared resource(s) 110. Agent 104 may comprise software for detecting data race conditions in program 102 and suggesting solutions to remove the detected data race conditions. The solutions may be suggested by way of user interface 106.

Agent 104 may use information calculated by observing the available synchronization mechanisms in program 102 to generate suggestions for removing detected data race conditions. Program 102 may use various synchronization object types (e.g., locks, mutexes, events, semaphores, barriers, etc.) to implement synchronization of the memory accesses in the application, for example. Agent 104 may use a lockset mechanism, a vector clock mechanism, or both to implement synchronization analysis, for example. It is noteworthy that if lockset information is not available, locksets may be initialized to a default value (e.g., { }). Also, if a vector clock mechanism is not in use, vector clocks may be initialized to a default value (e.g., approximately (0, 0)).

A lockset may be a data structure that represents the set of lock synchronization objects (hereafter "sync objects") held at a particular point in time or for a particular event. A vector clock may be a data structure that represents the time-ordered relationship between events. A vector clock may be included in each sync object. A lockset and a vector clock may be included in each thread and shared resource 110. A sync object table may be a data structure comprising each sync object in program 102.

Figure 2A:
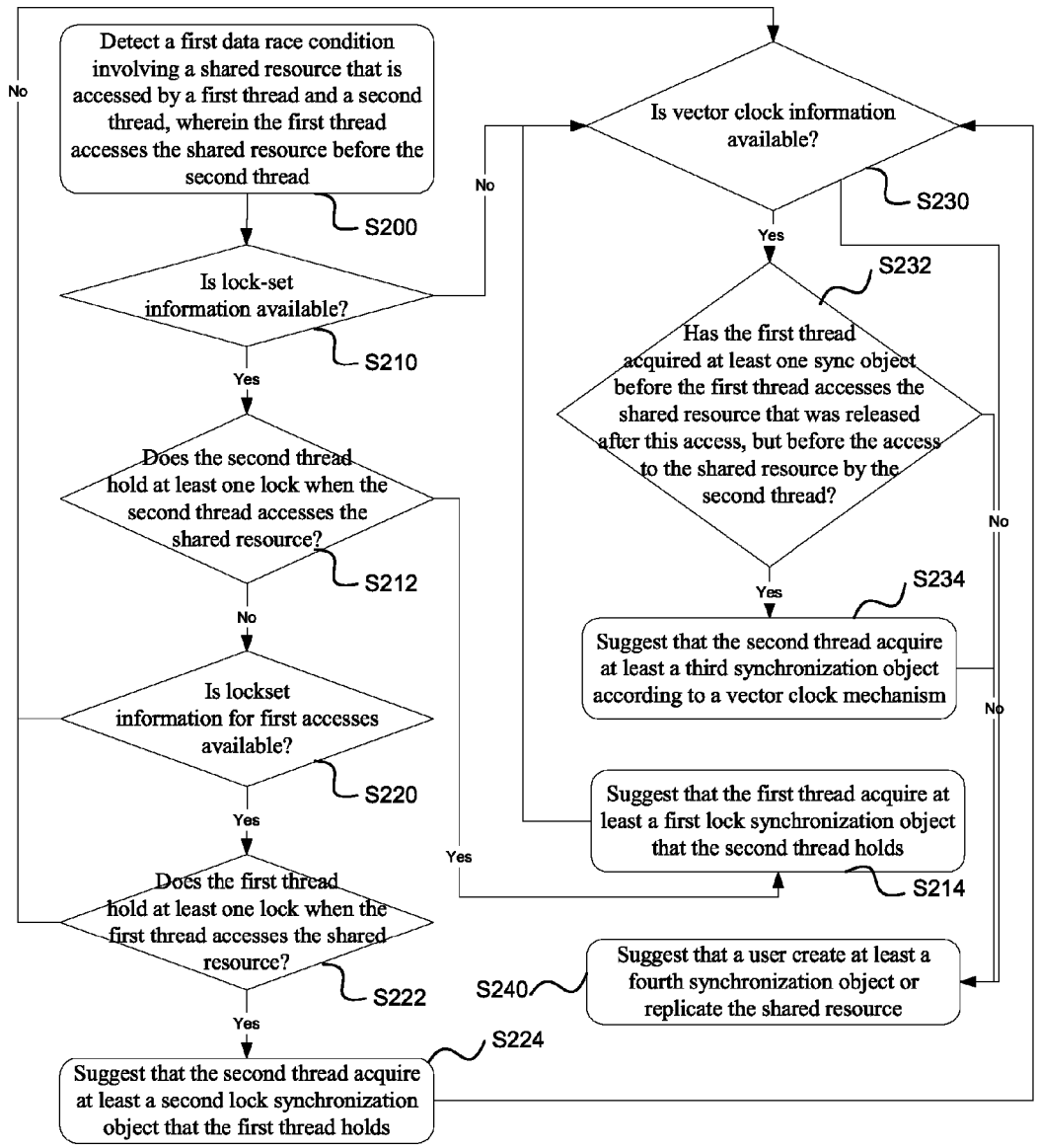
FIGS. 2*a* and 2*b* are flow diagrams of an exemplary method for generating suggestions for removing a data race condition, in accordance with one embodiment.

Referring to FIGS. 1 and 2a, in accordance with one embodiment, agent 104 may generate, by way of user interface 106, a list of suggested solutions for correcting a data race condition in program 102, in response to detecting a data race condition between a first thread and a second thread, wherein the first thread accesses a shared resource 110 before the second thread (S200).

If lockset information is available (S210) and the second thread holds any locks when the second thread accesses shared resource 110 (S212), agent 104 may suggest that the first thread acquire one or more of the locks (S214). Since a data race condition is detected, the first thread and second thread are not synchronized with respect to shared resource 110. Therefore, the data race condition may be removed if the first thread is synchronized with the second thread by having the first thread acquire at least one lock that the second thread holds when the second thread accesses shared resource 110.

For example, a thread T1 may access a shared resource M1 before a thread T2 accesses M1. If T1 has a lockset LS1 containing locks S1 and S2 (e.g., LS1={S1, S2})when T1 accesses M1, and T2 has a lockset LS2 containing locks S3 (e.g., LS2={S3})when T2 accesses M1, agent 104 may suggest that T1 acquire S3.

If lockset information for first accesses to shared resource 110 by the first thread is available (S220) and the first thread holds any locks when the first thread accesses shared resource 110 (S222), agent 104 may suggest that the second thread acquire one or more of the locks (S224). Since a data race condition has been detected, the first thread and second thread are not synchronized with respect to shared resource 110. Therefore, the data race condition may be removed if the second thread is synchronized with the first thread by having the second thread acquire at least one lock that the first thread holds when the first thread accesses resource 110.

If vector clock information is available (S230) and the first thread is ordered by any sync object(s) when the first thread accesses shared resource 110 (S232), agent 104 may suggest that the second thread acquire a sync object according to a vector clock mechanism (S234).

In one embodiment, for example, a vector clock mechanism may involve two types of vector clocks, where each thread may maintain a first type of vector clock (e.g., indirect) or a second type of vector clock (e.g., direct)and each sync object may maintain a first type of vector clock (e.g., indirect) or a second type of vector clock (e.g., direct). A thread's vector clock may be advanced each time the thread performs a synchronization operation on a sync object. A sync object's vector clock may be advanced each time a synchronization operation (e.g., acquire sync object, release sync object, or other operation) is performed on the sync object. When a thread acquires a sync object, the thread's vector clock and the sync object's vector clock may be merged.

Depending on implementation, the vector clock mechanism may use vector clocks of either the first type (e.g., indirect) or the second type (e.g., direct). The merge function for two vector clocks of the first type (e.g., indirect) may take the maximum pair-wise element from both vector clocks. The merge function for two vector clocks of the second type (e.g., direct), on the other hand, may change the element of the vector clock which matches the thread doing the merge.

Figure 3:
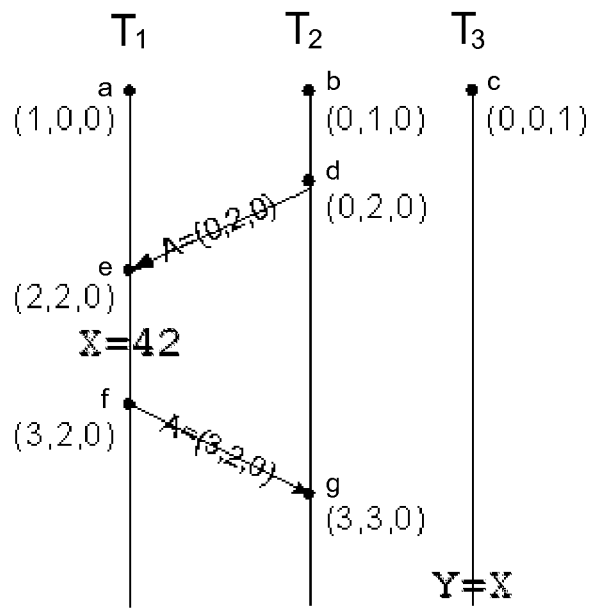
FIG. 3 illustrates a vector clock mechanism, in accordance with one embodiment.

FIG. 3, in accordance with one embodiment, illustrates a vector clock mechanism with timelines for threads $T_1$, $T_2$, and $T_3$. Vector clocks are represented by vector coordinates (#, #, #), where the first coordinate indicates the number of $T_1$'s operations, the second coordinate indicates the number of $T_2$'s operations, and the third coordinate indicates the number of $T_3$'s operations. Each thread has an initial vector clock labeled $T_1$=(1, 0, 0) at time a, $T_2$=(0, 1, 0) at time b, and $T_3$=(0, 0, 1) at time c. Since $T_2$ is initially ordered by A, A=(0, 1, 0) at time b. At time d, $T_2$ performs a synchronization operation, so $T_2$=(0, 2, 0) and A=(0, 2, 0). At time e, $T_1$ acquires A and $T_1$=(2, 0, 0), so $T_1$=(2, 2, 0) and A=(2, 2, 0) after $T_1$'s vector clock and A's vector clock are merged. At time f, $T_1$ performs a synchronization operation, so $T_1$=(3, 2, 0) and A=(3, 2, 0). At time g, $T_2$ acquires A and $T_2$=(0, 3, 0), so $T_2$=(3, 3, 0) and A=(3, 3, 0) after $T_2$'s vector clock and A's vector clock are merged.

In the example illustrated in FIG. 3, a resource shared by $T_1$, $T_2$, and $T_3$ (e.g., X), is accessed a first time by $T_1$ before time f and accessed a second time by $T_3$ after time g. A data race condition may be detected at $T_3$'s access because $T_1$=(2, 2, 0) and $T_{3=}(0, 0, 1)$ are not synchronized. Thus, the data race condition may be corrected if $T_3$ acquires A before X is accessed a second time. Agent 104 may find A by searching a sync object table using vector clocks of each sync object and $T_1$'s clock (e.g., 2)in $T_1$'s vector clock before time f.

Referring back to FIG. 2a, in addition to suggesting solutions based on lock-set or vector clock information, agent 104 may suggest that a user create a new sync object so that the first and second threads may be synchronized by acquiring the new sync object. Agent 104 may also suggest that the user replicate shared resource 110 so that synchronization is not at issue (S240).

Figure 2B:
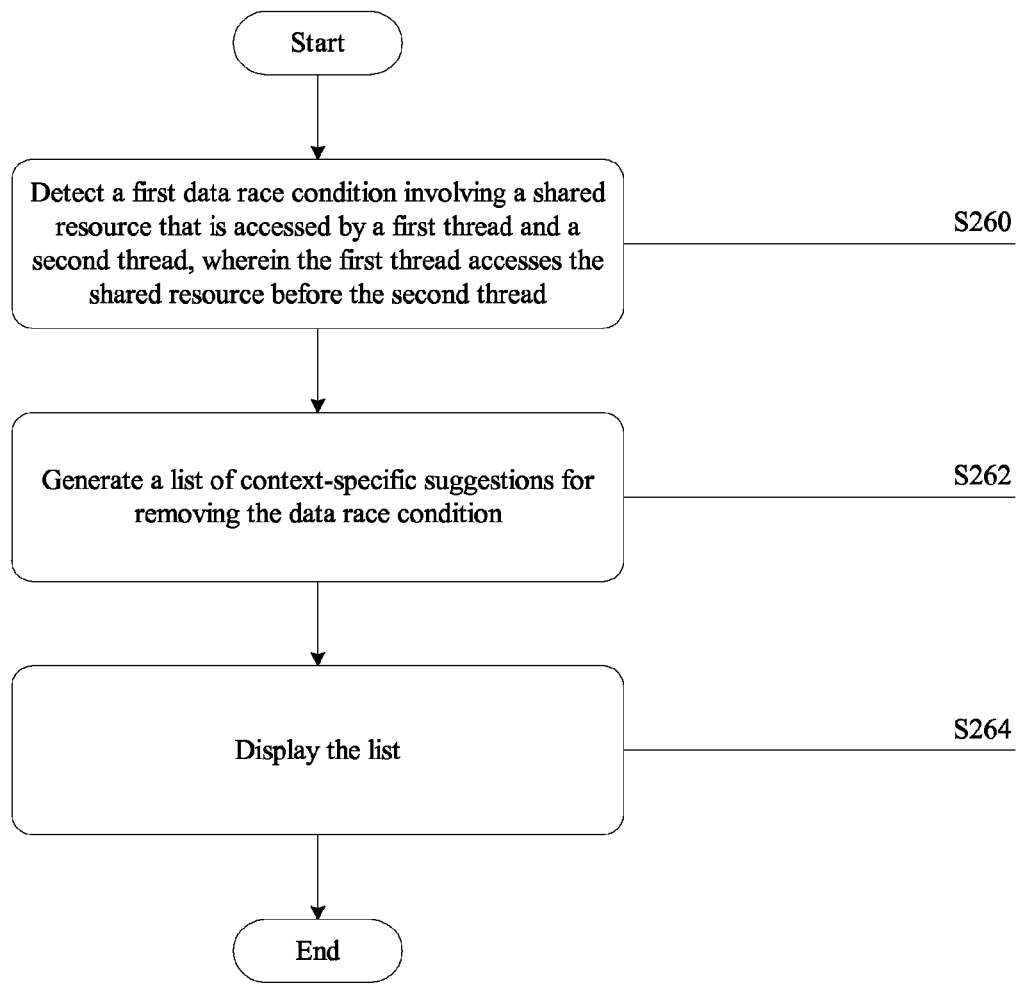

In summary, as provided in FIG. 2b, in accordance with one embodiment, agent 104 helps prevent a data race condition by detecting the data race condition (S260), generating a list of context-specific suggestions for removing the data race condition (S262), and displaying the generated list of suggestions (S264).

In some embodiments, if agent 104's list of suggestions may comprise more than one sync object, agent 104 may sort the list in the following order: sync objects that have already been accessed by the second thread may be suggested before sync objects that have not been accessed by the second thread; sync objects that have been accessed more recently by the second thread may be suggested before sync objects that have been accessed less recently by the second thread; a first class or type of sync object (e.g., "critical section") may be suggested before a second class or type of sync object (e.g., "mutex"); and the second type of sync object may be suggested before other more complex or expensive types of sync objects.

Depending on implementation, it is possible that the present invention may take the form of an entirely hardware embodiment, an entirely software embodiment or an embodiment containing both hardware and software elements. A software embodiment may include, but be not limited to, to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) may be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips may be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of correcting a first data race condition, the method comprising:
    detecting, in a computer, the first data race condition, encountered by the computer executing a program, involving a shared resource that is accessed by a first thread and a second thread, wherein the first thread accesses the shared resource before the second thread;
    generating a list of context-specific suggestions, specific to the context of the data race condition, for removing the data race condition,
    wherein the list comprises a suggestion that the first thread acquire at least a first lock synchronization object that the second thread holds, in response to
        determining that lockset information is available and
        determining that the second thread holds at least one lock synchronization object when the second thread accesses the shared resource, and
    wherein the list comprises a suggestion that the second thread acquire at least a second lock synchronization object that the first thread holds, in response to
        determining that lockset information for previous accesses to the shared resource is available,
        determining that the second thread does not hold at least one lock synchronization object when the second thread accesses the shared resource, and
        determining that the first thread holds at least one lock synchronization object when the first thread accesses the shared resource,
    displaying the list of context-specific suggestions through a user interface; and
    wherein the list comprises a suggestion that the second thread acquire at least a third synchronization object according to a vector clock mechanism, in response to
        determining that vector clock information is available and the first thread is ordered by at least the third synchronization object, and
    wherein the third synchronization object, if acquired by the second thread, removes the first data race condition.

2. The method of claim 1, wherein the vector clock mechanism increments a first vector clock, in response to the first thread performing a synchronization operation,
    wherein the vector clock mechanism increments a second vector clock, in response to the second thread performing a synchronization operation,
    wherein the vector clock mechanism increments a third vector clock, in response to the first thread performing a synchronization operation on the third synchronization object,
    wherein the vector clock mechanism increments the third vector clock, in response to the second thread performing a synchronization operation on the third synchronization object,
    wherein the vector clock mechanism merges the first vector clock with the third vector clock, in response to the first thread acquiring the third synchronization object,
    wherein the vector clock mechanism merges the second vector clock with the third vector clock, in response to the second thread acquiring the third synchronization object.

3. The method of claim 2, wherein the vector clock mechanism merges two vector clocks by taking the maximum pairwise element from both vector clocks.

4. The method of claim 2, wherein the vector clock mechanism merges two vector clocks by changing the element of the vector clock that matches the thread doing the merge.

5. The method of claim 1, wherein the list comprises a suggestion to create at least a fourth synchronization object.

6. The method of claim 1, wherein the list comprises a suggestion to replicate the shared resource.

7. The method of claim 1, further comprising sorting the list.

8. The method of claim 7, wherein the sorting comprises listing a suggestion involving a synchronization object that has already been accessed by the second thread before a suggestion involving a synchronization object that has not been accessed by the second thread.

9. The method of claim 7, wherein the sorting comprises listing a suggestion involving a synchronization object that has been accessed more recently by the second thread before a suggestion involving synchronization object that has been accessed less recently by the second thread.

10. The method of claim 7, wherein the sorting comprises listing a suggestion involving a synchronization object that belongs to a first class before a suggestion involving a synchronization object that belongs to a second class.

11. A system comprising:
a logic unit, in a computer, for detecting a first data race condition, encountered by the computer executing a program, involving a shared resource that is accessed by a first thread and a second thread, wherein the first thread accesses the shared resource before the second thread;
a logic unit for generating a list of context-specific suggestions, specific to the context of the data race condition, for removing the data race condition,
wherein said logic units comprise computer readable logic, stored on non-transitory computer readable media, that is executed on the computer,
wherein the list comprises a suggestion that the first thread acquire at least a first lock synchronization object that the second thread holds, in response to
determining that lockset information is available and
determining that the second thread holds at least one lock synchronization object when the second thread accesses the shared resource, and
wherein the list comprises a suggestion that the second thread acquire at least a second lock synchronization object that the first thread holds, in response to
determining that lockset information for previous accesses to the shared resource is available,
determining that the second thread does not hold at least one lock synchronization object when the second thread accesses the shared resource, and
determining that the first thread holds at least one lock synchronization object when the first thread accesses the shared resource, and
a logic unit for displaying the list of context-specific suggestions through a user interface
wherein the list comprises a suggestion that the second thread acquire at least a third synchronization object according to a vector clock mechanism, in response to determining that vector clock information is available and the first thread is ordered by at least the third synchronization object, wherein the third synchronization object, if acquired by the second thread, removes the first data race condition.

12. The system of claim 11, wherein the list comprises a suggestion to create at least a fourth synchronization object or replicate the shared resource.

13. The system of claim 11, further comprising a logic unit for sorting the list.

14. A computer program product for correcting a first data race condition comprising a non-transitory computer useable medium having a computer readable program, wherein the computer readable program when executed on a computer causes the computer to:
detect a first data race condition involving a shared resource that is accessed by a first thread and a second thread, wherein the first thread accesses the shared resource before the second thread; ang
generate a list of context-specific suggestions, specific to the context of the data race condition, for removing the data race condition,
wherein the list comprises a suggestion that the first thread acquire at least a first lock synchronization object that the second thread holds, in response to:
determining that lockset information is available and
determining that the second thread holds at least one lock synchronization object when the second thread accesses the shared resource, and
wherein the list comprises a suggestion that the second thread acquire at least a second lock synchronization object that the first thread holds, in response to
determining that lockset information for previous accesses to the shared resource is available,
determining that the second thread does not hold at least one lock synchronization object when the second thread accesses the shared resource, and
determining that the first thread holds at least one lock synchronization object when the first thread accesses the shared resource,
display the list of context-specific suggestions through a user interface, and
wherein the computer readable program when executed on a computer causes the computer to:
suggest that the second thread acquire at least a third synchronization object according to a vector clock mechanism, in response to determining that vector clock information is available and the first thread is ordered by at least the third synchronization object,
wherein the third synchronization object, if acquired by the second thread, removes the first data race condition.

15. The computer program product of claim 14, wherein the computer readable program when executed on a computer causes the computer to suggest creating at least a fourth synchronization object or replicate the shared resource.

16. The computer program product of claim 14, wherein the computer readable program when executed on a computer further causes the computer to sort the list.

* * * * *